Patented Sept. 13, 1938

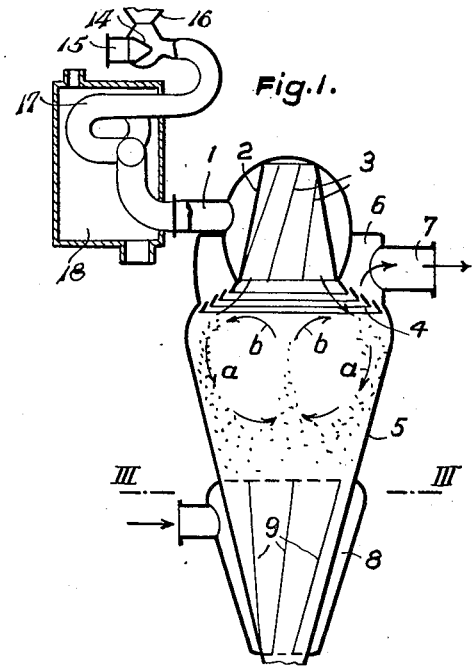
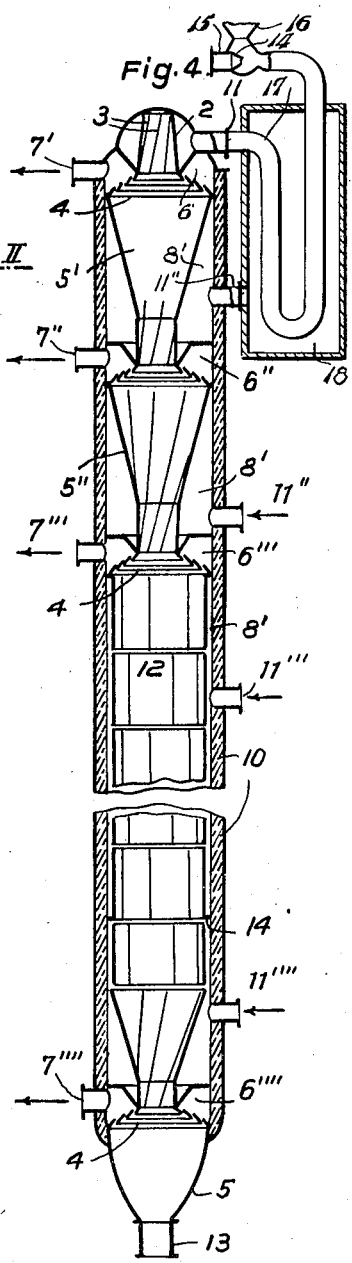
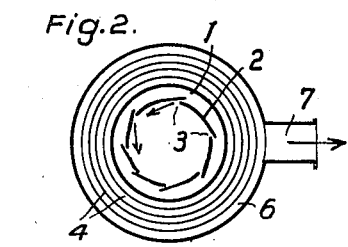
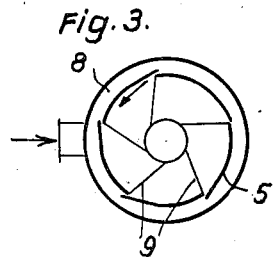
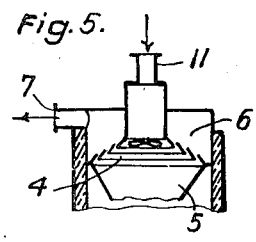

2,130,210

UNITED STATES PATENT OFFICE 2,130,210

SEPARATION AND GAS TREATMENT OF GAS-DUST MIXTURES

Kurd von Haken, Berlin, Germany

Application August 7, 1935, Serial No. 35,138
In Germany August 7, 1934

5 Claims. (Cl. 202—1)

The present invention relates to a method of separating out gas from gas-dust mixtures, particularly in chemical and thermal processes in which solid substances in the form of dust or liquid substances in atomized state are carried along with a gas current, suspended in the same, and also of performing other chemical treatments and reactions of various kinds. The invention also comprises means for carrying the said method into effect.

It has been proposed to separate out dust from gas-dust mixtures by causing such mixtures to flow past a plurality of narrow annular slots, arranged coaxially immediately adjacent each other, and removing the gas through these slots. Such a structure, which in a way resembles a Venetian blind, may for instance be formed by arranging a plurality of funnel-shaped bodies one within another in spaced relation.

According to the invention a centrifugal or twisting movement is imparted to the current of gas-dust mixture when it enters the apparatus in which the gaseous and the solid constituents of the mixture are separated from each other.

The intimate mixture of gas and dust is whirled downward and part of the gas can be sucked off through a system of coaxial annular slots arranged below the inlet openings, whilst the remaining mixture, now containing dust in higher concentration, is forced downward by its own gravity. The mixture can be conducted into a so-called cyclone funnel, or a whirling motion may again be imparted to the same under addition of fresh gas.

Coal dust of any kind (including brown coal dust) together with the gas, from which the carbon dioxide has been washed away, or another material in the form of dust together with the appertaining gas, may for instance be passed through a coil-shaped preheater or another preheater in which it for instance is heated to about 250° C., whereupon the preheated mixture may be introduced into the novel apparatus.

Some constructional forms of an apparatus by the aid of which the improved method may be practiced, are shown diagrammatically by way of examples in the accompanying drawing.

Fig. 1 is a central vertical section of the upper part of an apparatus constructed in accordance with the invention.

Fig. 2 is a cross section taken on the line II—II of Fig. 1.

Fig. 3 is a cross section taken on the line III—III of Fig. 1.

Fig. 4 is a central vertical section of a modified apparatus adapted for use in the heat treatment and eventually the pressure treatment or the vacuum treatment of coals, peat or other bituminous materials in the form of dust with scavenging gases.

Fig. 5 is a central vertical section of the upper part of an apparatus in which the gas-dust mixture to be treated is introduced axially.

The apparatus shown in Figs. 1-3 can for instance be for the treatment of coal dust in the production of benzene.

5 denotes a substantially conical introduction or cyclone chamber which through an inlet tube 1 and a hollow conical member 2 communicate with a preheater (not illustrated). The conical inlet member 2 is formed with a plurality of tangential, inclined inlet channels or slots 3, which impart a rotary motion to the mixture of gas and dust introduced through the tube 1, so that the mixture is whirled through the chamber 5. As shown in Fig. 5 the mixture of gas and dust coming from the preheater may also be introduced into the apparatus in axial direction and the stream of material may by means of suitable baffles or deflecting members be caused to whirl through the apparatus.

Below the cone 2 the chamber or container 5 is furnished with a system of annular slots 4 through which part of the gas in the gas-dust mixture is deflected away from the downwardly flowing mixture under reversal of the direction of motion of the gas. The remaining gas-dust mixture is of course richer in dust than the originally introduced mixture and consequently of a higher specific weight than the latter. This heavier mixture is now whirled further downward through the apparatus in the direction of the arrows $a$, whereby the dust is separated out by degrees. In the central part of the chamber 5 the dust-containing gas will stream upward, substantially in the direction of the arrows $b$. This phenomenon is the counter-cyclone which arises in all cyclones. The counter-cyclone is taken along with the primarily entering dust. Part of the gas is through the system of annular slots 4 deflected into the collecting chamber 6 and is sucked out of this chamber through the tube 7, which is equipped with means for regulating the flow.

The cyclone containers 5 merge into funnels which are formed with tangential slots 9 and which over a part of or their total length are surrounded by jackets forming outer chambers 8, through which the scavenging or working gas is forced. This gas is through the tangential slots 9 drawn into the chambers 5, thereby acting as a substitute for at least part of the gas already drawn off. This gas flow prevents the dust from settling on the walls of the chamber 8 in the form of lumps or layers and simultaneously serves to initiate a vigorous whirling of the mixture in a direction transverse to the direction of the main flow, as a preparation for the following stage of work.

In the modified apparatus shown in Fig. 4 the cyclone or whirling chambers and the reaction chamber 12 are surrounded by a heat insulating jacket 10, which is separated from the said chambers by an intermediate space 8'. As a continuation of the cyclone funnels 5', 5" a pressure decomposition plant is arranged, which consists of a column-shaped reaction chamber 12 having tangentially directed inclined whirling slits in its walls. In Fig. 4, 6', 6", 6''' and 6'''' denote collecting chambers for the deflected gas and 7', 7", 7''' and 7'''' denote tubes through which the gases in the collecting chambers are drawn off. The gas-dust mixture and the working gas are through the supply tubes 11', 11", 11''', 11'''', etc., supplied to the pressure decomposition plant and to the reaction chamber, which latter is formed with tangential whirling slots. The upper gas collecting chamber 6' above the funnel 5' serves for collecting or separating the oxygenous gases which otherwise would give rise to the formation of cresol. Any desired number of gas collecting chambers can be employed. At a pressure above atmospheric of 20 atmospheres, temperatures of about 230° to 330° C. will be used, so that water and the aldehydes from the mixture or the dust can be removed without any essential amounts of tar being formed.

The funnel 5", shown in Fig. 4, which over its entire length is formed with tangential slots, serves for preheating the dust with scavenging gas, whereby a large part of the working gases, which for instance may have a temperature of about 350° C., can be utilized in the lower parts of the apparatus. This saves considerable amounts of heat, which otherwise would have been required for heating the gas in the reaction chamber.

The carbon dioxide, which at high temperatures, particularly is separated out from brown coal and peat is already at these temperatures set free and removed in considerable amounts.

Assuming that in each of the cyclone phases ¾ of the introduced amount of gas is separated out together with the water, the $CO_2$ and the $H_2S$ etc. formed, then in the first phase ¼, in the second phase about 1/12 and in the third phase about 1/18 of the separated water will remain. The amount of water separated out would otherwise cause undesired complications during the pressure decomposition.

The space 8' within the jacket 10 is by means of a cross-wall 14 divided in two sections, so that the gas-dust mixture can be cooled to the desired degree before the dry coke formed leaves the apparatus, which for instance may take place through a lock 13.

The preheater consists of a tube coil 17 arranged in a furnace 18. The gas-dust mixture is introduced into the preheater by means of an injector 14, which receives gas and dust through the tube 15 from the funnel 16.

It is moreover also possible to employ the novel method and the novel apparatus for burning cement when the material is in the form of dust or powder. In this case the walls of the reaction chambers, in which the tangential slots and the coaxial, annular slots are formed, must be made from a refractory material, since it is not possible to work with evaporation of water as in cement furnaces of the usual kind.

The dust, which during the treatment has sintered together to small lumps is in the lower part of the apparatus cooled by means of air in counter-current and this air is in the higher sections utilized for heating purposes.

The advantages of the described method reside mainly in the continuous regulation of the composition. By means of the novel method is it possible to utilize the heat in an extremely advantageous manner, in that, after the preheating of the previously mixed slightly moistened dust with coal and the removal of the required heating gases at about 300–350° C. through the annular slots directly above the reaction chamber, the burning process proper can be performed with gases moving in the same direction as the gas-dust mixture, under utilization of previously heated air.

The novel method can also be used for drying easily clogging or baking dust.

I claim:

1. A method of separating out gas from gas-dust mixtures, particularly in chemical and thermal process, comprising preheating a gas-dust mixture, introducing the preheated mixture into a separation plant, causing the mixture to whirl downward through the plant, deflecting part of the gas from the mixture, while reversing the direction of flow of part of the gas and subdividing this part of the gas current, repeating the whirling and deflecting operation, adding gases to the downward flowing mixture from below and collecting and cooling the final dust-shaped product.

2. A method of separating out gas from gas-dust mixtures, particularly in chemical and thermal process, comprising preheating a gas-dust mixture, introducing the preheated mixture into a separation plant in the direction of the axis of this plant, causing the mixture to whirl downward through the plant, deflecting part of the gas from the mixture, while reversing the direction of flow of this part of the gas and subdividing this part of the gas current, repeating the whirling and deflecting operations, adding gases to the downward flowing mixture from below, and collecting and cooling the final dust-shaped products.

3. A method of separating out gas from gas-dust mixtures, particularly in chemical and thermal process, comprising preheating a gas-dust mixture, introducing the preheated mixture into a separation plant, in a direction substantially perpendicular to the axis of the said plant, causing the mixture to whirl downward through the plant deflecting part of the gas from the mixture, while reversing the direction of flow of this part of the gas and subdividing this part of the gas current, repeating the whirling and deflecting operation, adding gases to the downward flowing mixture from below and collecting and cooling the final dust-shaped products.

4. A method of separating out gas from gas-dust mixtures, particularly in chemical and thermal process, comprising preheating a gas-dust mixture, introducing the preheated mixture into a separation plant, causing the mixture to whirl downward through the plant, deflecting part of the gas from the mixture, while reversing the direction of flow of this part of the gas and subdividing this part of the gas current, repeating the whirling and deflection operations, conducting the remaining mixture into a pressure decomposition chamber and treating the mixture with heating and scavenging gases.

5. An apparatus for separating out gas from gas-dust mixtures, particularly in chemical and thermal processes, comprising in combination, a series of whirl chambers arranged below one another, a substantially cylindrical heat insulating jacket, surrounding the said chambers in spaced relation to the same, inlet tubes for supplying gas-dust mixture to the said chambers, a system of slotted members for imparting a whirling motion to the gas-dust mixture on entering a whirl chamber, a system of coaxial annular slots, arranged below each whirl producing system and being adapted to deflect part of the gas in the mixture, thereby reversing its direction of flow, and means for blowing scavenging gas through the entire apparatus.

KURD VON HAKEN.